United States Patent [19]

Vaughn et al.

[11] Patent Number: 4,621,315

[45] Date of Patent: Nov. 4, 1986

[54] RECIRCULATING MOS CHARGE PUMP

[75] Inventors: Herchel A. Vaughn; Joe W. Peterson, both of Austin, Tex.

[73] Assignee: Motorola, Inc., Schaumburg, Ill.

[21] Appl. No.: 771,919

[22] Filed: Sep. 3, 1985

[51] Int. Cl.$^4$ .......................................... H02M 3/155
[52] U.S. Cl. .......................................... 363/60; 320/1
[58] Field of Search ........................ 363/59, 60; 320/1

[56] References Cited

U.S. PATENT DOCUMENTS 4,047,091  9/1977  Hutchines et al. ................... 363/59
4,053,821  10/1977  Hose et al. ............................ 363/60

FOREIGN PATENT DOCUMENTS 9571  1/1983  Japan ...................................... 363/60

Primary Examiner—William H. Beha, Jr.
Attorney, Agent, or Firm—Anthony J. Sarli, Jr.; Jeffrey Van Myers; Robert L. King

[57]  ABSTRACT

A charge pump which can operate at low supply voltages is provided. The charge pump recirculates charge in response to an alternating clock signal which alternates the charge across a plurality of charge storage devices. Charge recirculation is used to compensate for threshold voltage drops associated with diodes or diode-configured transistors used to implement the charge pump. As a result, voltage amplification can occur in the charge pump even for small power supply values.

12 Claims, 2 Drawing Figures

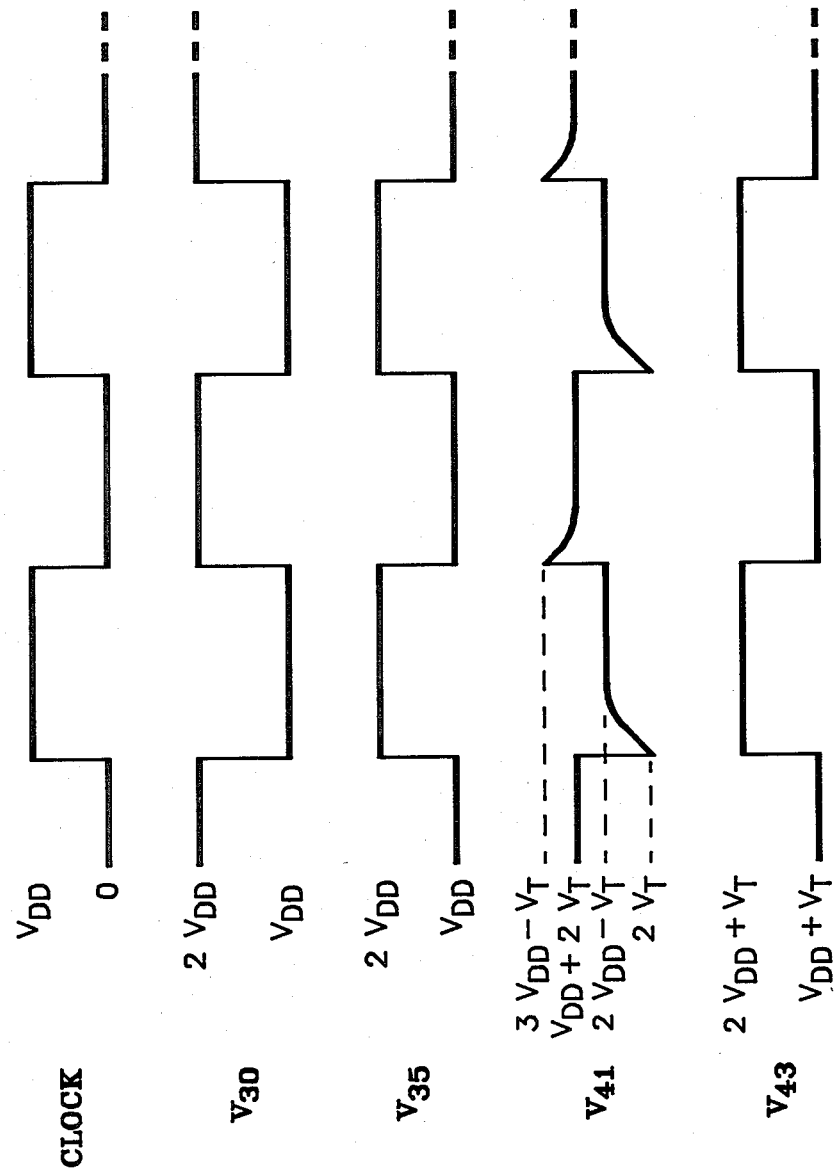

RECIRCULATING MOS CHARGE PUMP

TECHNICAL FIELD

This invention relates generally to analog circuits requiring operating voltages greater than available power supply voltages, and more particularly, to charge pump circuits.

BACKGROUND ART

Analog circuits are typically being designed to operate at low power supply voltages such as five volts. Although five volts is a commonly found power supply voltage level, power supply voltages of three volts and less are more desirable for battery operated circuits where power consumption is critical. Even in automotive applications where higher supply voltages are typically present, three volt power supply operation is desirable due to the wide variation of battery voltage which is possible. Typical analog circuits including analog switches however require a voltage greater than three volts to be operational. Therefore, a charge pump which functions to boost the level of the power supply for predetermined portions of a circuit must be utilized. Conventional charge pump circuits utilize diodes which are typically implemented by diode configured N-channel transistors in MOS circuits. A disadvantage with previous charge pump circuits results from a threshold voltage drop which is present across a diode or diode configured transistor. The threshold voltage drop decreases the output voltage of the charge pump by the threshold voltage value and may drastically reduce the efficiency of the charge pump. The reduced efficiency may be a critical factor when supply voltages of three volts or less are used because the threshold voltage of a diode becomes a significant portion of the power supply voltage. As a result, known charge pump circuits are not reliable for power supply potentials of three volts and less.

BRIEF DESCRIPTION OF THE INVENTION

Accordingly, an object of the present invention is to provide an improved charge pump circuit.

Another object of the present invention is to provide an improved charge pump circuit for use with power supply voltages less than five volts.

Yet another object of the present invention is to provide an improved CMOS recirculating charge pump which substantially eliminates the effects of undesirable threshold voltage drops.

In carrying out the above and other objects of the present invention, there is provided, in one form, a circuit for increasing a power supply voltage from a power supply source and providing a boosted output voltage at an output terminal. A diode is coupled between a supply terminal for receiving the power supply voltage and the output terminal. The diode has a predetermined threshold voltage drop associated therewith and prevents current flow from the output terminal to the power supply source. Charge storage means are selectively coupled via a coupling device also having a threshold voltage drop to the output terminal. The charge storage means selectively store the power supply voltage and a boost voltage to provide the boosted output voltage. Compensation means are coupled to the diode, to the coupling device and to the charge storage means for providing compensation for the threshold voltage drops. Therefore, the threshold voltage drops do not degrade the performance of the charge pump.

These and other objects, features and advantages will be more clearly understood from the following detailed description taken in conjunction with the accompanying drawings.

BRIEF DESCRIPTION OF THE DRAWINGS

FIG. 2 illustrates in schematic form voltage waveforms associated with the circuit of FIG. 1.

DETAILED DESCRIPTION OF THE INVENTION

Figure 1:
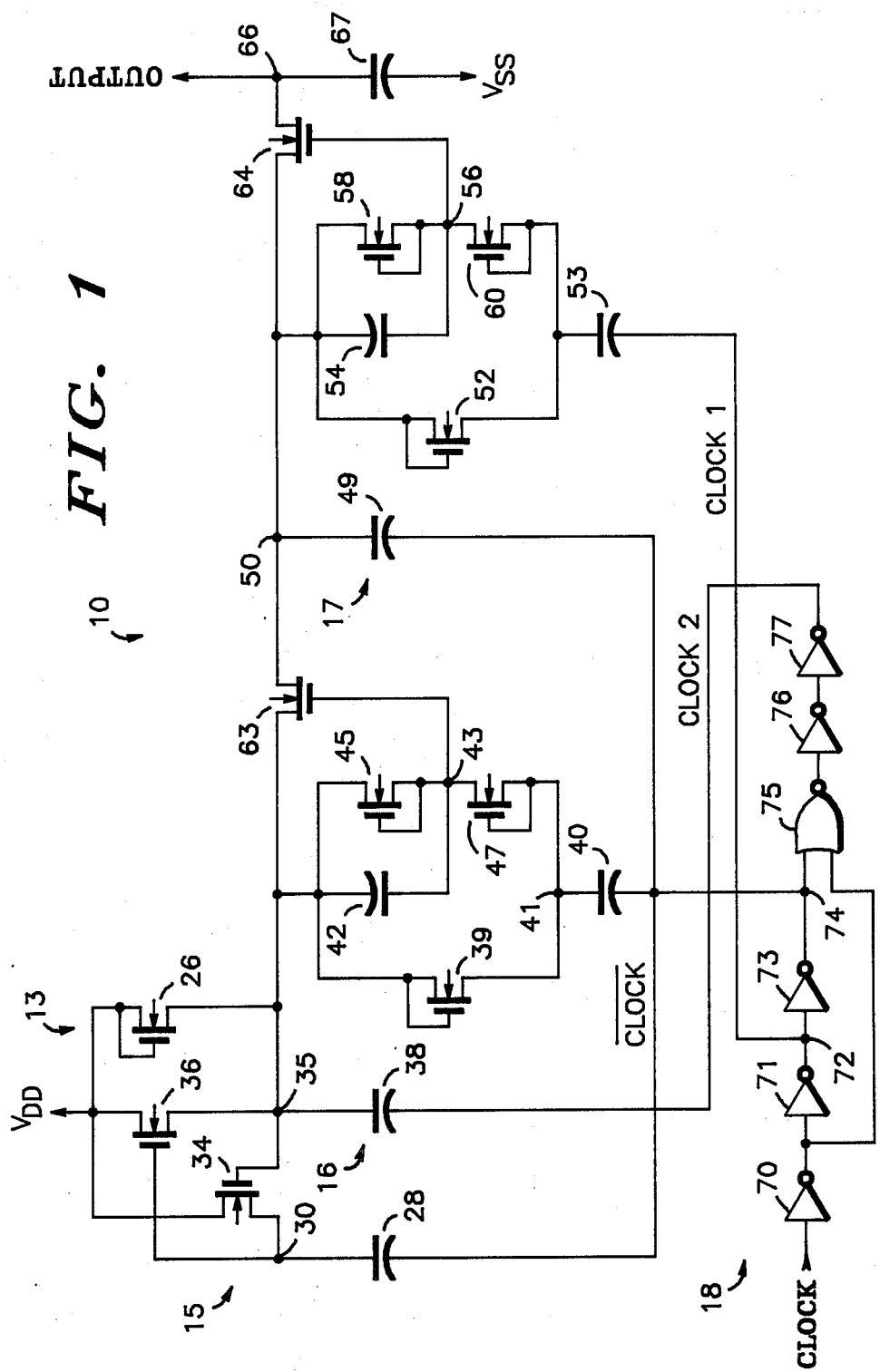
FIG. 1 illustrates in partial schematic form a charge pump circuit in accordance with the present invention.

Shown in FIG. 1 is a charge pump 10 generally comprising diode portion 13, pump portions 15, 16 and 17 and clock portion 18. It should be understood that although specific N-channel and P-channel MOS devices are shown, charge pump 10 may be implemented by completely reversing the processing techniques (e.g. N-channel to P-channel) or by using other types of transistors.

Diode portion 13 generally comprises a diode configured N-channel transistor 26 having both a gate and a drain connected to power supply $V_{DD}$. It should also be apparent that other known semiconductor structures which function as a diode may be used in place of a diode configured MOS transistor.

Pump portion 15 generally comprises a capacitor 28 having a first electrode connected to a node 30. A second electrode of capacitor 28 is connected to a complement of a clock signal. An N-channel transistor 34 has a drain connected to power supply $V_{DD}$, a gate connected to a node 35, and a source connected to node 30. An N-channel transistor 36 has a drain connected to power supply $V_{DD}$, a gate connected to node 30, and a source connected to node 35.

Pump portion 16 generally comprises a capacitor 38 having a first electrode connected to node 35, and a second electrode connected to a clock signal labeled "CLOCK 2". An N-channel transistor 39 has a drain and a gate connected together to node 35. A source of transistor 39 is connected to a first electrode of a capacitor 40 at a node 41. A second electrode of capacitor 40 is connected to a complement of the clock signal. A first electrode of a capacitor 42 is connected to node 35, and a second electrode of capacitor 42 is connected to a node 43. An N-channel transistor 45 has a source connected to node 35, and both a gate and a drain connected together to node 43. A source of an N-channel transistor 47 is connected to node 43, and both a gate and a drain of transistor 47 are connected to the first electrode of capacitor 40 at node 41.

Pump portion 17 generally comprises a capacitor 49 having a first electrode connected to a node 50, and a second electrode connected to the complement of the clock signal. An N-channel transistor 52 has a drain and a gate connected together to node 50, and a source connected to a first electrode of a capacitor 53. A second electrode of capacitor 53 is connected to a clock signal labeled "CLOCK 1". A first electrode of a capacitor 54 is connected to node 50, and a second electrode of capacitor 54 is connected to a node 56. An N-channel transistor 58 has a source connected to node 50, and both a gate and a drain connected together to node 56. An N-channel transistor 60 has a source connected to node 56, and both a drain and a gate connected together and coupled to the first electrode of capacitor 53.

An N-channel transistor 63 has a drain connected to node 35, a gate connected to node 43 and a source connected to node 50. An N-channel transistor 64 has a drain connected to node 50, a gate connected to node 56 and a source connected to an output terminal 66. A capacitor 67 has a first electrode connected to output terminal 66 and a second electrode connected to a second supply voltage, say $V_{SS}$. In the illustrated form, supply voltage $V_{SS}$ is less positive than supply voltage $V_{DD}$.

Clock portion 18 generally comprises an inverter 70 having an input for receiving a clock signal labeled "CLOCK" and an output connected to an input of an inverter 71. An output of inverter 71 provides the "CLOCK 1" signal and is connected to the second electrode of capacitor 53 at a node 72 and is connected to an input of an inverter 73. An output of inverter 73 is connected to a first input of a NOR gate 75 at a node 74. A second input of NOR gate 75 is connected to an output of inverter 70. An output of NOR gate 75 is connected to an input of an inverter 76 which has an output connected to an input of an inverter 77. An output of inverter 77 provides the "CLOCK 2" to the second electrode of capacitor 38.

Referring to associated waveforms in FIG. 2, the operation of charge pump 10 may be more readily understood. The waveforms of FIG. 2 represent steady state circuit conditions and do not illustrate initial start-up voltage conditions. Effects of parasitic capacitance are also not illustrated in the FIG. 2 waveforms but will be discussed below. A square wave clock signal which oscillates between zero volts or ground potential and the power supply voltage $V_{DD}$ is coupled to the input of clock portion 18 at the input of inverter 70. For the purpose of explanation, assume that charge pump 10 is in a steady state of operation and that the clock signal is initially at a high logic level (i.e. the inverse clock is at zero volts) before transitioning to the zero volt potential. Since the inverse of the clock signal potential is coupled to capacitor 28, capacitor 28 charges to the supply voltage $V_{DD}$ potential during this time period because node 30 is at the $V_{DD}$ potential and the clock signal is at zero volts. Therefore, in addition to other circuit conditions to be explained below, the voltage at node 30 denoted as "V30" in FIG. 2 is initially at $V_{DD}$. However, the voltage at node 30 will be equal to $2V_{DD}$ volts as shown in FIG. 2 during low cycles of the clock signal. The voltage $2V_{DD}$ occurs at node 30 during low clock cycles in the following way. Simultaneous to the charging of capacitor 28 to $V_{DD}$, node 35 is being boosted above $V_{DD}$ volts toward $2V_{DD}$ by capacitor 38 and the CLOCK 2 signal. The threshold voltage drops associated with all of the diode configured transistors of charge pump 10 are each presumed substantially equal and each is designated by $V_T$. Therefore, node 35 is at a potential of approximately $2V_{DD}$. When the clock signal transitions to $V_{DD}$, the lower or second electrode of capacitor 28 is coupled to ground and node 30 initially transitions to $V_{DD}$ volts. A very short delay period later, the CLOCK 2 signal is coupled as a high level signal to capacitor 38. In response, node 35 transitions from nearly $V_{DD}$ to substantially $2V_{DD}$. The voltage potential at node 35 makes transistor 34 conductive which couples $V_{DD}$ to node 30. Since node 35 is at a higher voltage than node 30, transistor 36 is nonconductive. When the clock signal transitions again to a low level signal, the voltage at node 30 is increased by $V_{DD}$ volts and returns to $2V_{DD}$ volts. Simultaneously, node 35 drops $V_{DD}$ volts to a potential of $V_{DD}$. Node 35 is pulled all the way to $V_{DD}$ as a result of transistor 36 becoming conductive to directly couple the $V_{DD}$ power supply terminal to node 35. The next half clock cycle when $V_{DD}$ is coupled to the second electrode of capacitor 38, the node 35 potential approaches $2V_{DD}$. Therefore, capacitors 28 and 38 and transistors 34 and 36 function in combination to eliminate the effect of the threshold voltage drops between $V_{DD}$ and node 35 and between $V_{DD}$ and node 30. Transistor 26 functions to allow start-up of operation of transistors 34 and 36 and capacitors 28 and 38. The resulting voltage at node 35 varies between a full $V_{DD}$ potential and a boosted $2V_{DD}$ potential.

In operation, the boosted voltage of $2V_{DD}$ at node 35 is selectively coupled to node 50 via coupling transistor 63 where the voltage is boosted another $V_{DD}$ by capacitor 49. The voltage at node 50 is desired to vary between $2V_{DD}$ and $3V_{DD}$ and is selectively coupled to capacitor 67 when the voltage is $3V_{DD}$. Therefore, the output voltage is charged onto capacitor 67 and provided as a constant $3V_{DD}$. However, when the voltage at node 35 is coupled to node 50, the voltage at node 35 would be reduced by the threshold voltage drop of transistor 63 if transistor 63 were connected in a conventional diode configuration. Therefore, transistors 39, 45 and 47 and capacitors 40 and 42 function in combination to substantially eliminate the threshold voltage drop of transistor 63 so that the full potential of $2V_{DD}$ is coupled to node 50.

In the illustrated form, the voltage at node 41 varies between four distinct voltage potentials as the complement clock signal varies between zero and $V_{DD}$ volts. Assume that the CLOCK 2 signal is initially at $V_{DD}$ and the complement clock signal at node 74 is at zero volts. The voltage potential of $2V_{DD}$ at node 35 charges capacitor 40 via transistor 39 which is conductive. Therefore, the voltage at node 41 is $(2V_{DD}-V_T)$. When the CLOCK 2 signal transitions to zero volts and the complement clock signal is at $V_{DD}$, node 35 transitions to $V_{DD}$ and node 41 is boosted to $(3V_{DD}-V_T)$. A voltage of substantially $(2V_{DD})$ minus a threshold voltage drop $(V_T)$ exists across transistors 45 and 47. Capacitor 40 is therefore discharged via transistors 45 and 47 until node 41 reaches $(V_{DD}+2V_T)$ and node 43 reaches $(V_{DD}+V_T)$.

It should be readily apparent that a threshold voltage has been charged onto capacitor 42 when the clock signal is at zero volts. Since capacitor 42 is connected between the gate and drain of transistor 63, capacitor 42 pre-biases transistor 63 with a threshold voltage. Transistor 63 therefore functions as a diode configured transistor with no threshold voltage drop. If transistor 45 is fabricated with the same control electrode dimensions as transistor 63, transistors 45 and 63 have substantially the same threshold voltage. Therefore, the threshold voltage of transistor 45 which is stored onto capacitor 42 provides the correct bias across the gate and source of transistor 63 to cancel the threshold voltage drop of transistor 63. As a result, the voltage at node 50 will vary substantially between $2V_{DD}$ and $3V_{DD}$ as the lower or second electrode of capacitor 49 varies between zero and $V_{DD}$ volts. Coupling transistor 64 has a threshold voltage drop associated therewith which is compensated in an analogous manner by transistors 52, 58 and 60 and capacitors 53 and 54. The transistor dimensions of transistors 45, 63 and 58, 64 may be adjusted for less drive voltage to reduce reverse leakage current through transistors 63 and 64. The present invention provides a significant advantage over previous charge pumps in that large output voltages may be provided from supply voltages of less than five volts. Knowing that the voltage differential between node 35 and node 41 must be equal to at least two threshold voltage drops, a theoretical minimium value of $V_{DD}$ may be readily determined. Since $$V_{41(max)} - V_{35(min)} \geq 2V_T$$

must be satisfied in order to charge a compensating threshold voltage onto capacitor 42, it follows that the minimum value for $V_{DD}$ is:

$$V_{DD} \geq (3/2) V_T.$$

For supply voltage values less than $(3/2) V_T$, the threshold voltage drop across transistor 63 cannot be cancelled completely and the output voltage of charge pump 10 will be reduced from the intended value. However, for MOS processes in which a transistor threshold voltage varies between one and two volts, charge pump 10 is fully functional for supply voltages as low as between two and three volts.

In one form, the output voltage may be limited by connecting node 50 to power supply voltage $V_{DD}$ via a conventional diode clamp (not shown) such as two series connected diode configured N-channel MOS transistors. The purpose of such a diode clamp would be to limit the output voltage to a predetermined maximum value if the power supply value is subject to wide variation.

Clock portion 18 functions to coordinate the switching of the charge boosting of nodes 30, 35 and 50. A transition of a clock signal is initially reflected by CLOCK 1 which affects the charging and discharging of capacitor 53. When the complement clock signal transitions, the voltage at nodes 30, 41 and 50 changes in direct response. After the bias voltage of transistor 36 is established, the CLOCK 2 signal transitions to change the voltage at node 35. It should be apparent that many other types of clock logic circuits could be used to effect the required switching. A significant aspect of the clock timing provided by clock portion 18 is the fact that transistor 36 should be made nonconductive before capacitor 38 is charge boosted so that the charge on capacitor 38 does not leak back to the $V_{DD}$ power supply. Additionally, the second electrodes of capacitors 40 and 53 should be clocked before nodes 35 and 50 are clocked, respectively. By first clocking capacitors 40 and 53, circulation of charge thru transistors 39, 45 and 47 and capacitor 42 begins immediately after a clock signal transition. Otherwise, the charging and discharging action of capacitors 38 and 49 by other coupled devices in charge pump 10 could inhibit charge circulation thru transistors 39, 45 and 47 and capacitor 42.

By now it should be apparent that a charge pump has been provided which operates at low supply voltages below five volts as well as at higher voltages. The present invention may be practised with one or more pump stages such as stage 16 depending upon an actual value of output voltage desired. Although the detailed description of the present invention does not acknowledge the effects of parasitics associated with the various nodes of pump 10, pump 10 remains effective in providing an accurate amplified output voltage at node 66 even when charge sharing of the nodal voltages occurs with parasitic capacitance.

While an embodiment has been disclosed using certain assumed parameters, it should be understood that certain obvious modifications to the circuit or the given parameters will become apparent to those skilled in the art, and the scope of the invention should be limited only by the scope of the claims appended hereto.

We claim:

1. A circuit for increasing a power supply voltage from a power supply source and providing a boosted output voltage at an output terminal, comprising:

diode means coupled between a first node and a supply terminal adapted to receive the power supply voltage, said diode means having a threshold voltage and preventing current flow from the first node to the supply terminal;

first charge storage means coupled to the output terminal for selectively storing the power supply voltage and a boost voltage to provide the boosted output voltage; and transistor coupling means having a control electrode, a first current electrode coupled to the first node, and a second current electrode coupled to the output terminal, and a threshold voltage associated therewith;

wherein the improvement comprises:

compensation means coupled between the first node and the control electrode of the transistor coupling means, for providing a control voltage to the control electrode sufficiently above the threshold voltage of the transistor coupling means so as to reduce the effective threshold voltage drop between the first node and the output terminal to substantially zero volts.

2. The circuit of claim 1 wherein said compensation means further comprises:

second compensation means coupled between the supply terminal and the first node, for preventing the first node from dropping below the power supply voltage.

3. The circuit of claim 2 wherein said second compensation means further comprises:

a first transistor having its current conducting electrodes coupled between the supply terminal and the output terminal, and having a control electrode coupled to a first node;

a second transistor having its current conducting electrodes coupled between the supply terminal and the first node, and having a control electrode coupled to the output terminal; and second charge storage means coupled to the first node for selectively storing the boost voltage.

4. The circuit of claim 1 wherein said compensation means further comprise means coupled between a predetermined one of the current electrodes of the transistor coupler and the control electrode of the transistor coupler, for cancelling the threshold voltage drop of the transistor coupler and making said threshold voltage drop substantially zero volts, comprising:

second charge storage means coupled between the output node and the control electrode of the transistor coupler;

a first diode configured transistor having both a first current electrode and a control electrode connected to the output terminal, and a second current electrode;

a second diode configured transistor having a first current electrode coupled to the output terminal, and both a second current electrode and a control electrode connected to the control electrode of the transistor coupler;

a third diode configured transistor having a first current electrode coupled to the control electrode of the transistor coupler, and both a second current electrode and a control electrode connected together; and third charge storage means coupled to the second current electrodes of the first and third diode configured transistors, for selectively storing the boost voltage.

5. The circuit of claim 1 further comprising:

clock means for receiving an input clock signal and providing therefrom a control signal and a complement thereof as the boost voltage to the charge storage means and to the compensation means, respectively.

6. A charge pump circuit for boosting a power supply voltage to provide a boosted output voltage, comprising:

a diode configured transistor having a first current electrode and a control electrode connected together and coupled to a terminal for receiving the power supply voltage, and a second current electrode connected to a first node for supplying a primary voltage at the first node, said diode configured transistor having a first threshold voltage drop associated therewith;

first capacitance means having a first electrode coupled to the first node and a second electrode for selectively receiving a clock signal voltage, said capacitance means boosting the primary voltage at the first node to a secondary voltage;

first compensation means coupled in parallel with the diode configured transistor for compensating for the first threshold voltage drop so that the primary voltage substantially equals the power supply voltage;

output capacitance means for selectively storing the secondary voltage to provide the boosted output voltage;

transistor coupler means having a second threshold voltage drop associated therewith, said transistor coupler means having a control electrode and current conducting electrodes which selectively couple the first node to the output capacitance means; and second compensation means coupled between the control electrode and a predetermined one of the current conducting electrodes of the transistor coupler means for compensating for the second threshold voltage drop so that the boosted output voltage substantially equals the secondary voltage at the first node.

7. The charge pump of claim 6 wherein the first compensation means comprise:

a first transistor having a first current electrode coupled to the terminal for receiving the power supply voltage, a control electrode and a second current electrode coupled to the first node;

a second transistor having a first current electrode coupled to the terminal for receiving the power supply voltage, a control electrode coupled to the first node, and a second current electrode coupled to the control electrode of the first transistor; and second capacitance means having a first electrode coupled to the second current electrode of the second transistor, and a second electrode for selectively receiving the clock signal voltage.

8. The charge pump of claim 6 wherein the second compensation means further comprise:

second capacitance means having a first electrode coupled to the first node and a second electrode coupled to the control electrode of the transistor coupler means;

a first diode configured transistor having a first current electrode coupled to the first node and both a control electrode and a second current electrode coupled to the control electrode of the transistor coupler means;

a second diode configured transistor having a first current electrode coupled to the control electrode of the transistor coupler means, and both a control electrode and a second current electrode connected together;

a third diode configured transistor having both a first current electrode and a control electrode coupled to the first node, and a second current electrode coupled to the second current electrode of the second diode configured transistor; and third capacitance means having a first electrode coupled to the second current electrodes of the second and third diode configured transistors, and a second electrode for selectively receiving the clock signal voltage.

9. The charge pump of claim 7 wherein the second capacitance means selectively receives the clock signal voltage by receiving a delayed complement of the clock signal voltage.

10. The charge pump of claim 8 wherein the third capacitance means selectively receives the clock signal voltage by receiving a delayed complement of the clock signal voltage.

11. A method of providing a boosted output voltage from a power supply voltage, comprising the steps of:

coupling a power supply voltage terminal to a first node via a diode means having a first threshold voltage drop associated therewith;

coupling charge storage means to the first node for selectively boosting the first node's voltage potential to a predetermined voltage potential;

selectively coupling the first node to an output charge storage means via a coupling device having a second threshold voltage drop associated therewith; and compensating for the second threshold voltage drop so that the voltage potential coupled to the output charge storage means substantially equals the voltage potential of the first node.

12. The method of claim 11 further comprising the step of:

compensating for the first threshold voltage drop of the diode means so that the first node has the same voltage potential as the power supply voltage terminal.

* * * * *